United States Patent [19]

Jackson

[11] Patent Number: 4,470,574
[45] Date of Patent: Sep. 11, 1984

[54] SUPPORT STRUCTURE FOR BUILDING FORMS

[76] Inventor: George W. Jackson, 3785 Myrtle St., Burnaby, B. C., Canada

[21] Appl. No.: 239,348

[22] Filed: Mar. 2, 1981

Related U.S. Application Data

[63] Continuation-in-part of Ser. No. 149,641, May 14, 1980, abandoned, which is a continuation of Ser. No. 968,282, Dec. 11, 1978, abandoned.

[51] Int. Cl.³ .................. E04G 1/15; E04G 11/00; E04G 11/18; E04G 11/36
[52] U.S. Cl. .................. 249/205; 211/182; 249/29; 249/219 R; 403/49; 403/191; 411/427
[58] Field of Search .................. 249/28, 30, 24, 18, 249/31, 29, 205, 219 R; 403/190, 187, 191, 49; 411/427; 52/632; 211/182

[56] References Cited

U.S. PATENT DOCUMENTS

| | | | |
|---|---|---|---|
| 2,345,650 | 4/1944 | Attwood | 411/427 |
| 2,962,170 | 11/1960 | Best | 403/187 |
| 3,744,945 | 7/1973 | Metrailer | 425/62 |
| 4,070,845 | 1/1978 | Cody | 52/632 |

FOREIGN PATENT DOCUMENTS

| | | | |
|---|---|---|---|
| 1807257 | 2/1970 | Fed. Rep. of Germany | 249/28 |
| 2325683 | 12/1973 | Fed. Rep. of Germany | |
| 47729 | 4/1909 | Switzerland | 249/28 |
| 870428 | 6/1961 | United Kingdom | 403/190 |
| 1534870 | 12/1978 | United Kingdom | 249/28 |

Primary Examiner—Willard E. Hoag

[57] ABSTRACT

A support structure formed in one or more sections, the support structure having vertical legs which are extensible at upper and lower ends thereof and being able to support concrete building forms at two different levels utilizing horizontal saddle beams near the top thereof to support a building form at one level with the extensible upper legs supporting a second building form at a second level. The saddle beams each include a pair of vertically spaced support surfaces preferably in the form of a pair of outwardly extending flanges proximate the top and bottom of a central web extending outwardly from the beam to form opposed surfaces, flanges or ledges and a connector at either end of the saddle beams, for securing the saddle beams to the legs, each connector preferably connected to the saddle beam by a bracket supported by the spaced support surfaces and secured to the web of the saddle beam to abut the opposed flanges. The vertical legs are extensible by extension tubes, the extension tubes and portion of the legs from which the extension tubes extend having equally spaced aligned holes therethrough including diametrically opposed semi-circular apertures in the extension tubes at the ends of the extension tubes extending from the legs. A U-shaped connector pin connects the extension tubes and legs together.

22 Claims, 13 Drawing Figures

SUPPORT STRUCTURE FOR BUILDING FORMS

This is a continuation-in-part application of continuation Ser. No. 149,641 filed May 14, 1980 which is a continuation of application Ser. No. 05/968,282, filed Dec. 11, 1978, both now abandoned.

FIELD OF INVENTION

This invention relates to support structures formed in one or more sections and components therefor, the support structures for supporting building forms at different levels, such as forms for concrete slabs and forms for drop beams associated therewith.

BACKGROUND OF THE INVENTION

A newly formed concrete slab needs to be shored for a comparatively short time, normally only a few days, while the drop beams normally need to be supported for a longer period, such as fourteen days. As a result, the forms for the concrete slab are often tied up for comparatively long periods of time.

As this type of construction is common and usually occurs in relatively large buildings, it is advantageous to shift the concrete forms from one area to another as soon after the pouring of the concrete as possible. The longer the forms have to remain in position supporting the concrete in one location, the greater the number of forms that must be available for the job. Therefore, if it is possible to move the slab forms without disturbing the beam forms from a given location in a relatively short time, the number of slab forms required can be reduced. This will be seen as an important economical factor when one realizes that the cost of the floor slabs is considerably greater than that of the drop beams.

Shoring towers or structures have been used for many years to support slab forms and drop beam forms. In the past, in order to remove the slab forms as soon as the slab was self-supporting, the upper end of the tower had to be loosened or taken down to release the slab forms. This also took the support off and released the beam forms. It was then necessary to retighten the existing support structure or build a new support to shore the beam for a further period. This system was costly and time-consuming, and it left the newly poured and relatively soft drop beams dangerously unsupported for a short time until they were shored up again and rarely reshored to the original tension.

The present invention overcomes these disadvantages by providing a support structure or tower that simultaneously and independently shores the slab forms and the associated beam forms. This support tower is constructed so that the slab forms can be easily released and removed without interfering with the support of the drop beam. In addition to this, each support tower or structure is of such light construction that it can be assembled in a horizontal position on the floor and then raised in ladder style to its vertical position, saving many hours of work. Although the tower is of simple and light construction, it is well braced, and the bracing and tower sections can be quickly assembled and disassembled. The tower or support structure may be made up of one or more similar tower sections surmounted one on the other, which sections may be of the same or different heights. In use, these sections can be quickly and easily interconnected, and braced by standard bracing extending between the sections to provide a very stable structure.

Therefore, a support structure according to one embodiment of the invention for simultaneously shoring up building forms at different levels is provided, and comprises at least one support section comprising a plurality of spaced pairs of vertical legs, the legs of each of said pairs being spaced apart on opposite sides of the support section, preferably by horizontal ledges extending between and secured to the legs of each pair of legs and supported by inclined cross-braces extending between and secured to the legs of one of said pairs and the adjacent legs of another of said pairs on the same side of the support section. In this embodiment, horizontal saddle beams may be secured at opposite ends to the legs of each said pairs near upper ends of the last mentioned legs to support at a first level a building form extending between these legs, and support members near ends of the saddle beams extending upwardly relative thereto to support a building form at a second level, said support members being movable away from the latter building form, and means may be provided for vertically adjusting the length of each leg.

In another embodiment, a support structure or tower in accordance with this embodiment of the invention, comprises at least one support section comprising a plurality of pairs of vertical legs, the legs of each of said pairs being spaced apart on opposite sides of the transverse section, preferably by ledgers extending between and secured to the legs of each pair of legs. The legs are also supported by inclined cross-braces extending between and secured to the legs of one of said pairs and the adjacent legs of another of said pairs of the same side of the two sections. Also in this embodiment, horizontal saddle beams are secured at opposite ends thereof to the legs of each said pairs near upper ends of the last mentioned legs to support at a first level a building form extending between these legs, said leg upper ends extending upwardly past the saddle beams to support a building form at a second level, and means are also provided for vertically adjusting the length of each of said legs.

Although these support structures may be used for supporting many things that need to be supported, they are particularly designed for supporting the forms for concrete slab floors and simultaneously supporting the forms for drop beams to be formed with the floors while the concrete for these is being poured, and shoring or supporting the slabs and beams until the concrete becomes self-supporting.

The horizontal saddle beams secured near upper ends of the legs comprise a pair of vertically spaced support surfaces preferably in the formed central web and a pair of flanges extending outwardly away from the central web proximate the top and bottom of the central web to form opposed ledges and a connector for securing the saddle beams to the legs, the connector being connected to the saddle beam supported by the spaced support surfaces and in one embodiment by a bracket (preferably secured to the web of the saddle beam) to abut the opposed ledges. Preferably, the brackets are each secured to a sleeve for securing to the legs and permitting the upper ends of the legs to telescopically extend past the saddle beam to support a building form at the second level. Also preferably, the saddle beam comprises a U-shaped channel at the top for carrying a wooden insert nailer.

Where the support structure carries two or more sections, the sections may be joined by pin means comprising two spaced arms as for example, U-shaped connector or security pins through aligned holes in the abutting legs of the joined sections and the internal or external coupling pins securing the legs of adjoining sections together. In this regard, the holes are so placed in the legs so that the spacing between the end aligned holes of the two vertically aligned legs of the section to be supported (including the vertical thickness of the collar of the coupling pin positioned between the legs) is equal to the distance between the arms of the U-shaped security pins. Holes are positioned through each of the legs at equal intervals starting from the end hole, corresponding to the distance between the arms. Preferably, one of the arms is longer than the other although both arms are sufficient in length to extend through the holes through the legs. Also preferably, the portion of the security pin connecting the arms is bent towards the extremities of the arm to act as a stop and limit penetration of the arms through the holes in the legs.

The means for vertically adjusting the length of the legs may comprise extnsion tubes internally extendable from the section legs. The extension tubes extending from the bottom of the support structure may be secured to screw jacks for sitting on earlier formed concrete slabs or timber sills. These extensions, as with the legs themselves, contain holes therethrough to permit passage of the U-arms of the securing pins therethrough. In the case of the extension tubes, half holes or semi-circular apertures may be formed at the very ends of the extension tube (in the case of the extension tube extending from the bottom of the section legs, the half holes is at the top of the extension tube, extending into the section leg; in the case of the extension tube extending from the top of the section legs, the half hole is at the bottom of the extension tube extending into the section leg) to ease and speed connection between the extensions and legs using the security pins having the two spaced arms.

Where the sections are to be secured to beams having T-shaped bolt slots in the base thereof, a plurality of bolts may be employed for securing in the T-shaped bolt receiving slots, each bolt comprising an elongated narrow head and stem, the head being of substantially the width of the bolt slot and having one set of diametrically opposite corners rounded, and the other pair of diametrically opposed corners square so that the bolt heads may enter the T-shaped slots anywhere along the beam slot and then by turning the bolt in one direction, the rounded corners permit the bolts to turn to a position across the slot whereat the square corners restrict the bolts from turning more than 180° in the T-shaped slots. Fasteners are provided on the other end of the bolt for connecting to other components.

In one example, when the legs extend up past the saddle beam by means of extension tubes, a screw jack is fitted into the upper end of the extensions when extending from the extensions and means are provided (in one embodiment, a bearing plate) to support or carry beams having a T-shaped slot therein. For securing the beams to for example, the bearing plate, T-shaped bolts may be employed for securing in the T-shaped slots of the beams and means on the other for securing to the plate, each bolt comprising an elongated narrow head and stem, the head being of substantially the width of the beam slot and having one pair of diametrically opposite corners rounded, and the other pair of diametrically opposed corners square so that the bolt heads may enter the T-shaped slots anywhere along the beam slot and then by turning the bolt in one direction, the rounded corners permit the bolts to turn to a position across the slot whereat the square corners restrict the bolts from turning more than 180° in the T-shaped slots. Fasteners are provided on the other end of the bolt for connecting to other components.

BRIEF DESCRIPTION OF THE DRAWINGS

This invention is illustrated in the accompanying drawings of a preferred embodiment in which.

DESCRIPTION OF A PREFERRED EMBODIMENT OF THE INVENTION

Referring to FIGS. 1 to 12 of the drawings, 10 is a support structure or tower in accordance with the preferred embodiment of this invention, used during the pouring of the concrete for a floor slab 12 and an integral drop beam 14 dropped therefrom to support these elements. The tower supports the forms for the slab and beam during the pouring of the concrete, and continues to support them after the pouring. When the concete has cured sufficiently to be partially self-supporting, the forms can be removed for further use elsewhere, and if necessary, the tower can be used to support the concrete for a further period. The illustrated tower is supporting at one level a form 16 for a poured in place beam, this form consisting of a bottom panel 17 and side members 18. The right side of the tower is supporting a slab form 22 made up of a bottom panel 23 resting on a plurality of laterally spaced beam joists 24. The side member 18 of beam form 16 and all of the slab form 22 have been removed from the left side of the drop beam so that the left portion of tower 10 is directly supporting the slab 12 thereabove in a reshored position. As beam 14 is well supported at this time, the reshoring of slab 12 so close thereto is feasible but not absolutely necessary.

Tower or support structure 10 is made up of one or more superimposed support sections, and in the illustrated example the tower includes a lower support section 30 and a similar upper support section 31. These support sections can be of the same height or can be of different heights, as shown. As these support sections are similar excepting for their respective heights, only one, namely section 30, will now be described in detail, the same reference numerals being used on both support sections.

Figure 1:
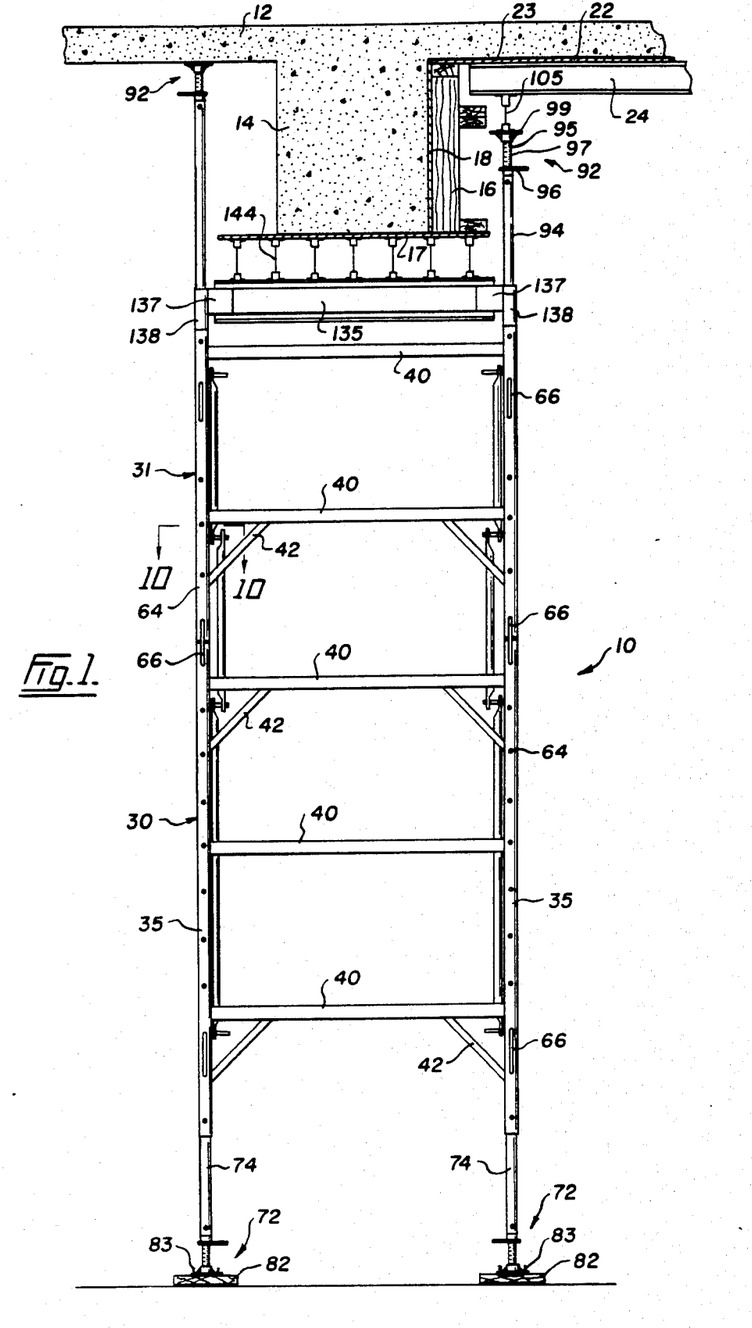
FIG. 1 is a end elevation of a preferred form of support structure according to this invention, showing floor slabs and a drop beam in section.

Support section 30 includes a pair of laterally spaced legs 35 at one end, and another pair of laterally spaced and similar legs 37 at an opposite end. These legs are preferably of tubular formation. The legs 35 are spaced apart and interconnected by suitable bracing, such as a plurality of horizontal ledgers 40 extending therebetween and secured thereto at opposite ends in any suitable manner, such as by welding, as shown in FIG. 1, and the legs 37 are similarly spaced apart and interconnected by bracing such as horizontal ledgers 40. The number of ledgers between each pair of legs will depend upon the height of the tower section and individual choice. As shown in FIG. 1, lower tower section 30 has three horizontal ledgers, whereas, upper tower section 31 has only two of these ledgers. These ledgers not only act as braces for the tower, but planks or the like can be laid thereon to act as platforms for workers. If desired, some or all of the ledgers 40 may be provided with angular braces 42 extending therefrom to adjacent legs 35, 37 to assist in bracing and stabilizing the tower.

Figure 2:
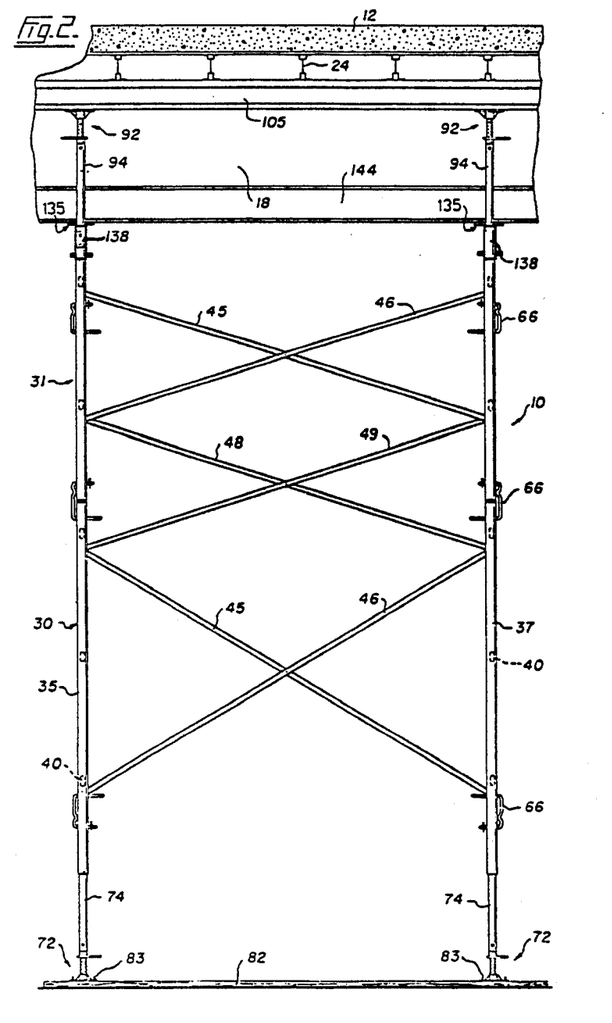
FIG. 2 is a side elevation of the structure.

Each tower or support section is provided with bracing in form of cross-braces 45 and 46 extending between the legs 35 and 37 at each side of the tower, see FIG. 2. These cross-braces are preferably removably connected to the tower legs, and suitable connector means will hereinafter be described. In the illustrated example of the invention, additional bracing in the form of a pair of mid-cross-braces 48 and 49 extend between the legs 35 and 37 of upper tower section 31 and the legs 37 and 35, respectively, of the lower tower section 30 at each side of the tower. It is preferable that the upper ends of braces 48 and 49 be connected to the tower legs by the same connectors as the lower ends of braces 45 and 46 of the upper tower section, and the lower ends of the mid-braces 48 and 49 connected to the legs of the lower tower section by the same connectors as the upper ends the braces 45 and 46 of the latter tower section, as shown in FIG. 2.

Figure 3:
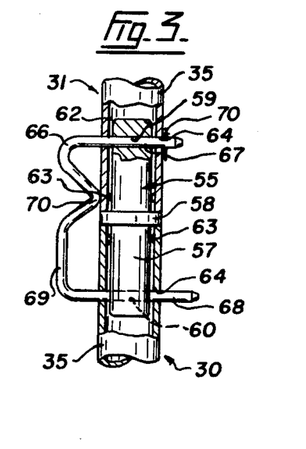
FIG. 3 is an enlarged sectional detail of connector and security pins used between support structure sections.
Figure 4:
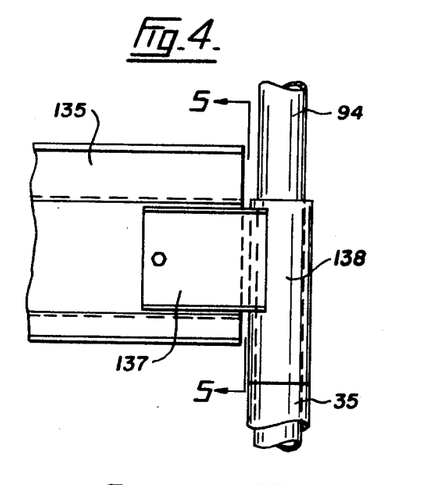
FIG. 4 is an enlarged detail of the connection at an end of a saddle beam to a structure leg.
Figure 5:
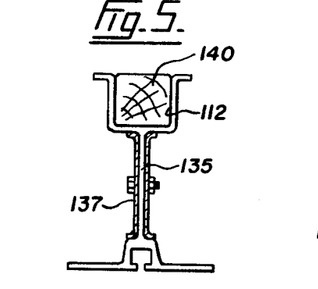
FIG. 5 is a vertical section taken on the line 5—5 of FIG. 4.

The corresponding legs 35 and 37 of tower sections 30 and 31 are longitudinally aligned and removably connected together so that they, in effect, constitute legs extending from the lower end to the upper end of the tower. FIG. 3 illustrates a preferred form of connector between the adjacent ends of two superimposed tower legs, such as the legs 35.

The lower end of upper leg 35 is releasably connected to the upper end of lower leg 35 by a connector 55. This connector includes a coupling pin 57 which is of such diameter as to slidably fit into the adjacent ends of the tower legs. This coupling pin has a collar 58 midway between its end, and radial holes 59 and 60 extending through the pin near its opposite ends. The ends of the coupling pin are formed with bevels 62 for ease of assembly. When assembled, coupling pin 57 fits into the adjacent ends of the two aligned legs 35, and these ends bear against collar 58 which acts as a bearing therebetween. This coupling pin is preferably a little smaller in cross-section than the legs into which it fits. In this case, dimples 63 are pressed inwardly of each leg so that the pin fits therebetween. These dimples hold the pin in its proper position while allowing the legs during assembly to be inclined a little relative to each other to make it easier for one tower section to be placed upon another section.

There are a plurality of evenly spaced holes 64 extending through each of the tower legs, and most of these holes are spaced apart a predetermined distance, for example, 6 inches. However, the holes near the opposite ends of the leg are spaced 2¾ inches from their respective ends. Collar 58 of coupling pin 57 of this example is one half inch thick so that when the tower legs are assembled, the holes near the ends of the legs are also spaced 6 inches from each other.

Holes 59 and 60 of pin 57 are spaced 6 inches apart so as to align with holes 64 near the ends of the tower legs in which said pin fits. A U-shaped connector pin 66 has arms 67 and 68 extending from a base 69 to extend through the aligned holes of the tower legs and the coupler pin. The base 69 of the U-shaped security pin acts as a handle to enable a person to insert and remove the security pin. Base 69 preferably is bent inwardly to form a stop 70 which engages one of the tower legs to limit the inward movement of the base when the connector pin arms are inserted in the leg holes. It will be noted that arm 68 is a little longer than arm 67 so that the former can be partially inserted into aligned holes while the latter is still clear of the legs. Following this, the security pin can be swung on arm 68 to align arm 67 with the leg holes into which the latter arm is to be inserted. Arm 67 or 68 is pierced near the free end thereof so as to receive a nail or cotter pin 70 after the arms have passed through the aligned holes in order to prevent the security pin from accidentally coming out of its position securing the tower legs together.

Figures 9, 12, 13:
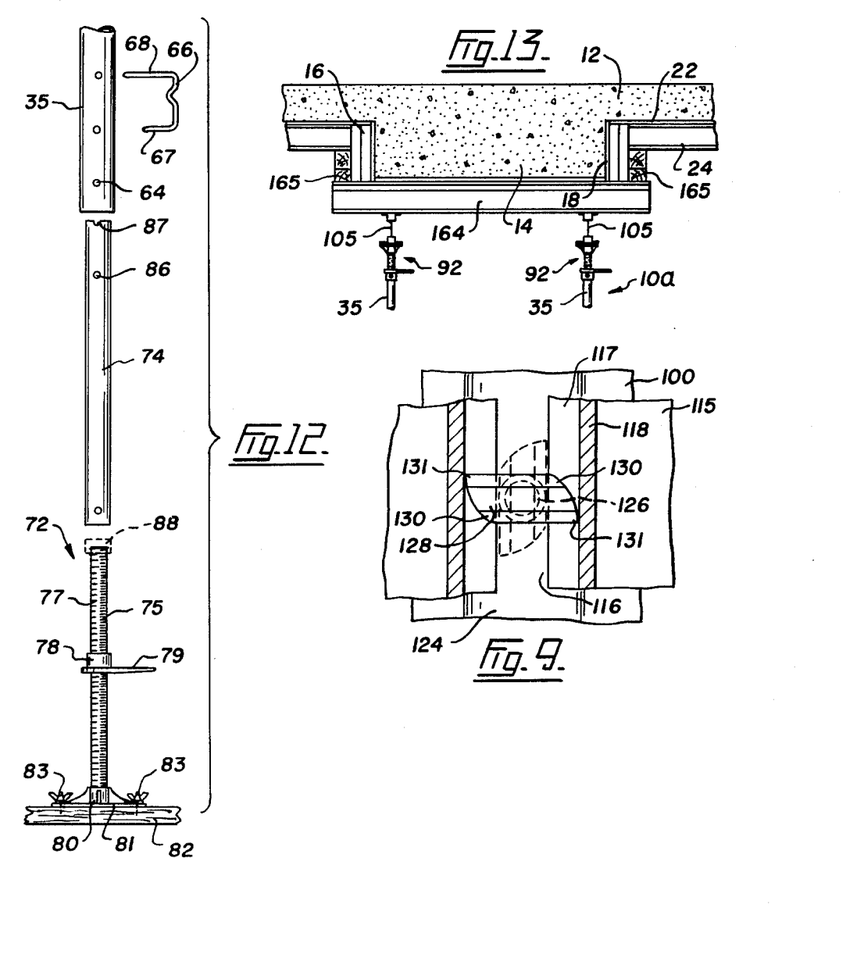
FIG. 9 is an enlarged fragmentary section taken on the line 9—9 of FIG. 7.
FIG. 12 is an exploded view of a jack arrangement at the lower end of a tower or structure leg.
FIG. 13 is a fragmentary end elevation of an alternative form of support tower according to this invention.

A jack arrangement 72 is provided at the lower end of each of the tower legs 35 and 37, See FIGS. 1, 2, and 12. In this example, each jack arrangement includes an extension tube 74 adapted to slidably fit within the lower end of lower leg 35, and a jack 72. This jack includes a threaded shaft 77 adapted to loosely fit within extension tube 74, and a nut 78 is threaded on the shaft. This nut has a body with the same width or diameter as the extension tube, and it has a handle 79 connected to and projecting laterally from its lower surface. Extension tube 74 rests on nut 78 so that when the latter is turned up or down on the jack shaft 77, the tower leg is raised or lowered. One end of the jack shaft fits into a socket 80 formed on a bearing plate 81 that can rest on and, if desired, be secured to a suitable support 82 by bolts, nails, screws or the like. The support body 82 may be in the form of a pad or beam or in any other suitable form. A nut and bolt arrangement 83, to be described later, is shown connecting the bearing plate 81 to a support 82 in the form of a beam.

Extension tube 74 is releasably secured to the lower end of leg 35 by a security pin 66 which is preferably positioned with its long arm 68 above its other arm 67. This pin extends through a selected pair of holes 64 of the tower leg, and a hole 86 in the extension tube spaced from the upper end thereof and aligned with one of the holes 64, and a half hole 87 formed in said upper end of the tube. The extension tube can be adjusted vertically relative to the leg. The extension tube allows for a coarse adjustment of the effective length of the tower legs, while the turning of nut 78 on the jack shaft allows for fine adjustment.

The spacing of hole 86 and half hole 87 in extension tube 74 is the same as that of holes 64 in the tower legs, see FIG. 12. With this arrangement, the end of the long arm 68 of a security pin 66 can be partly inserted in a hole 64 of the tower leg in which the extension tube is being inserted. When the end of the tube engages this pin arm, the extension tube 74 can be rotated until the pin arm drops into the half hole 87, at which time the hole 86 of the tube is aligned with a hole 64 of the leg thereby allowing both arms of the pin to be inserted completely through the leg and extension tube 74. Thus, the use of the half hole reduces the assembly time of the extension tube considerably. Therefore, the jack shaft will slidably fit into the lower end of the extension tube 74, the extension tube end resting on the body of the nut. In this case, a stabilizer 88 shown in broken lines in FIG. 2 is secured to the upper end of jack shaft 77 for fitting within the extension tube to reduce wobble.

If desired, the extension tube 74 may be omitted. In this case, the jack shaft 77 slidably fits in the tower leg 35 and the latter fits over the body of nut 78 and rests on the lower portion of the nut. In this case, a larger sized stabilizer 88, (See FIG. 12) is secured to the upper end of jack shaft 77 and slidably fits within the tower leg 35 to reduce wobble of the shaft therein. In some instances, both the extension tube 74 and jack 72 may be omitted, in which case a short tube (not shown) of the same diameter as extension tube 74 would fit into the lower end of the tower leg and a socket of a bearing plate (not shown), said leg resting on the bearing plate at this time, and secured by security pin 66.

A jack arrangement 92 similar to jack arrangement 72 is sometimes provided at the upper end of each tower leg. The jack arrangement 92 may inclue an extension tube 94 identical with extention tube 74, and a jack 95 having a nut 96 threaded on the shaft 97 thereof. The upper end of the jack shaft 97 is screwed into an internally-threaded socket 99 of a bearing plate 100 which is similar to bearing plate 81. If the jack arrangement 72 is omitted, as in the case of a flat concrete slab without the drop beam, the adjustment of the lengths of the tower legs is attained by means of upper jack arrangement 92. If circumstances warrant it, the extension tube 94 may be omitted. When used, the lower end of this extension tube is releasably connected to the upper end of the tower leg by a security pin 66 while the upper end of the tube fits over the lower portion of the jack shaft 97 and bears against nut 96. When support structure 10 is in use, the beam joists 24 are preferably supported by beam stringers 105 which extend at right angles to these beam joists. The legs 35 and 37 at one side of the tower support a beam stringer 105.

FIGS. 6 to 9 illustrate the bearing plate 100 secured to the beam stringer 105. If desired, stringers 105 may be omitted, in which case bearing plate 100 would be secured to a beam joist 24 in the same manner as to a stringer 105. The illustrated stringer 105 includes a web 110 with an enlarged upper edge or flange 111 with a large groove 112 opening outwardly therefrom. Another enlarged flange 115 extends along the lower edge of the web and has a narrow slot 116 opening outwardly therefrom and communicating with an enlarged recess 117 formed within an enlargement 118 of the flange and extending longitudinally of the beam.

Figure 6:
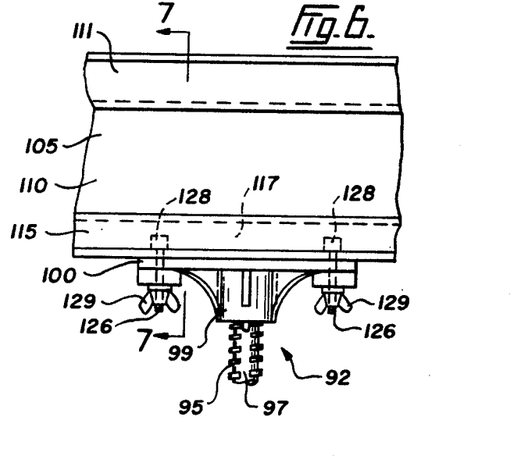
FIG. 6 is an enlarged detail showing the connection of a jack to a beam or beams stringer for supporting a slab form.
Figure 7:
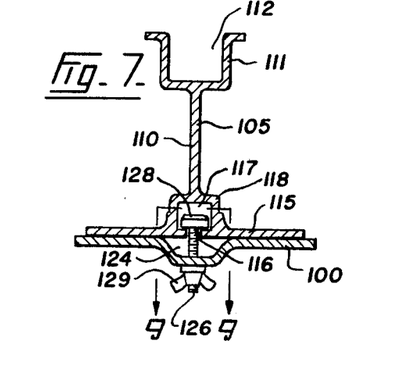
FIG. 7 is a sectional view taken on the line 7—7 of FIG. 6 showing a bolt in its normal holding position.
Figure 8:
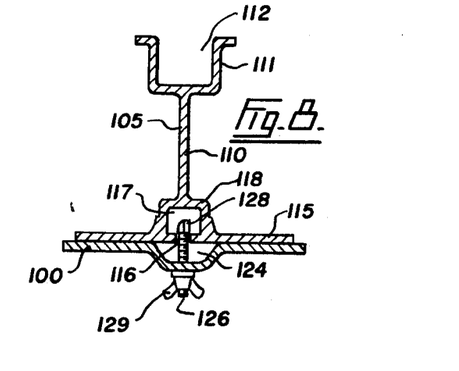
FIG. 8 is a view similar to FIG. 7, but showing the securing bolt in position to be inserted in or removed from the beam stringer.

In the illustrated form of the invention, the upper surface of plate 100 is formed with a groove 124 therein on opposite sides of socket 99, see FIGS. 6, 7 and 8.

Bolts 126 are provided for securing the plate 100 to beam stringer 105. Each bolt has a special elongated and narrow head 128 at one end, and a wing nut 129 threaded on its opposite end. When it is desired to secure the bearing plate to the stringer, two bolts 126 which extend through holes in plate 100 at its groove 124, are positioned so that their head 128 can be shifted out of said groove and through the beam slot 116, as shown in FIG. 9, after which each head is turned at right angles to the slot, see FIGS. 7 and 9, so that nuts 129 can be tightened to secure the bearing plate to the beam. By referring to FIG. 9, it will be seen that the bolt head 128 is formed with rounded diagonally opposite corners 130 and with diagonally opposite square corners 131. Rounded corners 130 will permit the bolt 126 to be rotated in one direction to turn the head 128 from its longitudinal cross slot position, while corners 131 by engaging the side walls of the stringer enlargement 118, will prevent the bolt from being turned further. Thus, corners 131 act as stops to limit the turning of the bolt head after said head has been inserted through stringer slot 116. It will be noted that the socket 99 of the bearing plate and the bolts, is centrally located directly below beam stringer 105 so that the tower leg associated with this plate is also directly below and in alignment with the stringer, eliminating any possibility of any overturning moment or eccentric loading through misalignment. It should be noted that bolts 83 of bearing plate 81 are preferably the same as bolts 126 when support 82 is in the form of a beam similar to stringer 105.

A pair of saddle beams 135 extend one between the two legs 35 at one end of the tower and the other between the two legs 37 at the opposite end thereof. These saddle beams may be of any desired lightweight construction, and the illustrated beams are similar to the beam stringers 105 described above. The saddle beams are identical and removably connected to their respective tower legs in any convenient manner. In this example, a bracket 137 is bolted to each end of the saddle beam, which beam has a centrally disposed web spacing opposed flanges secured to the upper top section and forming the bottom support flanges, and a vertical sleeve 138 is secured to each bracket in any suitable manner, such as by welding, see FIGS. 1, 2, 4 and 5. Each sleeve 138 is large enough to slidably fit over or rest on a tower leg. In this example, each sleeve is made so as to slidably fit over an extension tube 94 projecting from a tower leg 35 and in this case, the sleeve rests on the upper end of the tower leg, as clearly shown in FIG. 4. In this example, a wooden insert 140 is fitted into the upper top hat section or groove 112 along the upper edge of each saddle beam 135, see FIG. 5.

A plurality of beam joists 144 (See FIG. 1) similar to stringers 105 extend across the two saddle beams 135 of tower 10 and support the bottom panel 17 of beam form 16.

Figure 10:
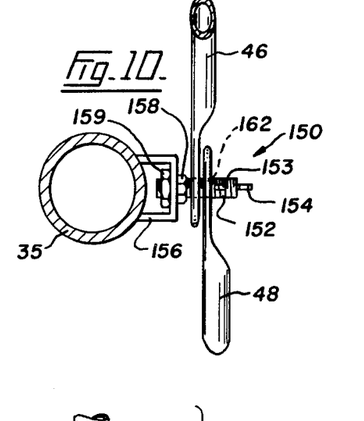
FIG. 10 is an enlarged horizontal section taken on the line 10—10 of FIG. 1.
Figure 11:
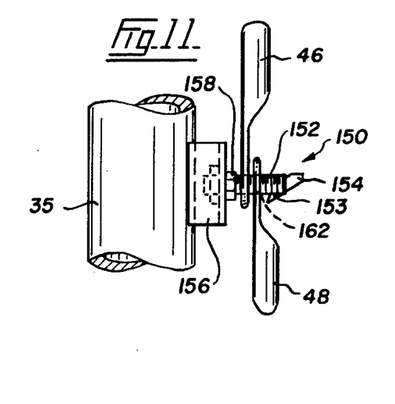
FIG. 11 is a side elevation of the structure shown in FIG. 10.

FIGS. 10 and 11 illustrate a suitable fast acting connector 150 for securing the ends of braces 45, 46 and 48,49 to the tower legs 35,37. Connector 150 consists of an externally threaded barrel 152 having a depressible latch 153 swingably mounted therein and normally projecting outwardly therefrom. This latch has a handle 154 projecting from the outer end of the barrel by means of which the latch can be swung inwardly into the barrel. The opposite end of barrel 152 extends through a U-shaped bracket 156, the legs of which are secured to the adjacent tower leg in any suitable manner, such as by welding. The barrel 152 is formed with a hexagonal section 158 spaced from the ends thereof. A nut 159 is threaded on the barrel and tightened against bracket 156 to draw the hexagonal section 158 against the bracket and thereby secure the barrel in position relative to the tower leg.

The cross braces 45, 46 and 48, 49 have holes 162 through their ends which can fit over the barrels 152 of connectors 150. In order to mount an end of a cross brace on one of these connectors, said brace end is slipped over and along the barrel 152, latch 153 swinging into the barrel to allow this to take place. When the brace end clears the latch, the latter is forced back to its normal position by an internal spring (not shown) so that the brace cannot come off the connector. To remove the brace, it is only necessary to depress the connector latch by handle 154 and then to slide the brace of the barrel. After a cross-brace has been secured to a tower leg, a nut, not shown, can be threaded onto barrel 152 to double lock the brace in position, if necessary.

The right side of the tower in FIG. 1 and the portion of the tower shown in FIG. 2 support the concrete forms at two different levels. The tower legs through jack arrangements 92 support the beam stringers 105 and beam joists 24 which carry slab form 22. These jack arrangements and the extension tubes 94, if used, act as support members for the slab forms 22. At the same time, the saddle beams 135 carry the second form by means of beam joists 144 which are supporting the bottom panel 17 of beam form 16. Before the cement is poured, the legs at the opposite side of the tower would also be supporting stringers 105 and beam joists 24, and the other side member 18 of form 16 would be in place. The lower jack and extension tube arrangements 72 and 74 respectively, are manipulated to raise the saddle beams into the proper position for supporting the drop beam form. The upper jack and extension tube arrangements 92 and 94 respectively are manipulated to raise the beams 105 and 24 to support the slab form 22 at the correct level.

After the concrete has been poured, and after the slab 12 has cured sufficiently to be self-supporting, jacks 95 are retracted to allow the components of the slab form 22 to be removed. The drop beam 14 is still fully supported at this time by the saddle beams, the weight being transferred by these beams to the vertical legs of the tower.

After the slab form has been removed, the extension tubes 94 can be extended to support the slab 12 without the slab form. The jacks 95 can now be adjusted so as to firmly support the slab 12. After the drop beam has cured sufficiently to be self-supporting, the lower jacks 72 are retracted to allow the beam form 16 to be removed.

Tower 10 can now be moved to another location, or if not needed, can be dismantled.

When the tower 10 is not in use, it can be easily taken apart. This tower is such that it can be quickly and easily re-erected. The various elements of lower tower section 30 are assembled first. The pairs of tower legs 35,37 interconnected by ledgers 40 are secured together by cross-braces 45,46 said cross-braces being secured to the tower legs by connectors 150. The extension tubes 74, if required, are inserted in the lower ends of the lower legs and secured thereto by security pins 66. Jacks 72 if required are then connected to the lower ends of these tubes.

In arrangements over 20' (3.3 meters) in height or in confined places, the jack arrangements 92 and the saddle beams 135 may be connected to the upper ends of the legs of tower section 30. If an upper tower section 31 is needed, the lower ends of its legs are connected to the upper ends of the legs of the lower section 30 by means of coupling pins 57, and if desired, security pins 66. Following this, the upper jack arrangements and the saddle beams are assembled. The lower jack arrangements 72 are operated to move the saddle beams into position to support the beam form 16 in its proper place, while jack arrangements 92 are operated to support the slab form 22 at a level above the bottom of beam form 16. The cross braces 45,46 of the two tower sections keep the latter rigid, and the cross braces 48,49 rigidly secure the legs of the upper section to the legs of the lower section. Planks can be laid along the ledgers 40 for workman to walk on when erecting and dismantling the tower and when working around the slab and beam forms.

In arrangements less than 20 feet (3.3 meters), the unique features of the embodiment allow all components of the tower except the cross-bracing to be assembled on the ground and raised in ladder fashion. FIG. 13 illustrates the upper end of an alternative form of support tower 10a. In this example, beam stringers 105 are carried by the upper jack arrangements 92 of the tower legs. Beams 164 extend across stringers 105 and support the drop beam form 16. In this example, the beam joists 24 which support the slab form 22 are carried by blocks or support members 165 which are mounted near the ends of the beams 164 outside the side members 18 of the drop beam form.

Tower 10a is the same as tower 10 and is operated substantially in the same manner. The beams 164 support the drop beam form 16 in the manner described above, but these beams are moved up into place and removed therefrom by manipulating jack arrangements 92. When it is desired to remove the slab forms 22 while still supporting the drop beam form, blocks 165 are knocked out after jack means 92 are loosened so as to release the beam joists 24. Following this the jack means 92 can be tightened if the beam 14 requires further supporting. Alternatively, the beam can be reshored by other methods, such as with single post props.

As many changes could be made to the preferred embodiments without departing from the scope of the invention, it is intended that all material contained herein be interpreted as illustrative of the invention and not in a limiting sense.

The embodiments of the invention in which an exclusive property or privilege is claimed are as follows:

1. A support structure formed in one or more sections, the support structure having vertical legs which are extensible at upper and lower ends thereof and being able to support concrete building forms at two different levels utilizing horizontal saddle beams near the top thereof to support a building form at one level with the upper legs when extended supporting a second building form at a second level, the horizontal saddle beams each comprising a pair of vertically spaced support surfaces and a connector at either end of the beam, for securing the saddle beams to the legs, each connector being connected to the saddle beam by a member supported to abut the spaced support surfaces, wherein each saddle beam comprises a central web and the pair of spaced support surfaces comprises a pair of flanges extending outwardly from the central web proximate the top and bottom of the central web to form opposed ledges against which the top and bottom of the member abut.

2. The support structure of claim 1 wherein each connector comprises a sleeve secured to the member.

3. The support structure of claim 1, wherein the member comprises a bracket connected to the connector.

4. The support structure of claim 3, wherein each connector also comprises a sleeve secured to the member.

5. The support structure of claim 1, wherein the lower ends of the legs are extensible by extension tubes telescopically extending from the lower ends of the legs, the extension tubes and the lower ends of the legs having equally spaced aligned holes therethrough with the upper end of each extension tube comprising diametrically opposed semi-circular apertures in the tube opening through the upper end and wherein the extension tubes and lower end of the legs are secured together by U-shaped security pins comprising two arms for removably securing the extension tubes to the legs.

6. The support structure of claim 5 wherein wherein one arm of each U-shaped security pin is longer than the other arm.

7. The support structure of claim 1, wherein the upper ends of the legs are extensible by extension tubes telescopically extending from the upper ends of the legs, the upper ends of the legs and extension tubes having equally spaced aligned holes therethrough and being secured together by U-shaped security pins comprising two arms for removably securing the extension tubes to the upper ends of the legs at various levels.

8. The support structure of claim 7, wherein the lower end of each extension tube comprises diametrically opposed semi-circular apertures in the tube opening through the lower end and wherein one arm of each U-shaped pin is longer than the other arm.

9. The support structure of claim 7, wherein the member comprises a bracket connected to the connector.

10. The support structure of claim 9, wherein each connector also comprises a sleeve secured to the member.

11. The support structure of claim 1, 7 or 10, wherein the saddle beam comprises a U-shaped channel at the top thereof for carrying a wooden insert nailer.

12. A support structure formed in more than one section, the vertically surmounting sections comprising at least one lower section and at least one upper section, each of the sections of the support structure having vertically extending legs, the legs on the upper section fixedly secured to the legs of the lower section and having equally spaced aligned holes through the legs when the sections are assembled, the legs of the upper section being secured to the legs of the lower section by coupling pins having corresponding aligned apertures therethrough and by U-shaped security pins having arms for removably fitting into the aligned holes of the legs and coupling pin, wherein the upper ends of the legs of the uppermost section are extendible by extension tubes telescopically extending from the upper ends of the legs, the extension tubes and the upper ends of the legs having equally spaced aligned holes therethrough with the lower end of each extension tube comprising diametrically opposed semi-circular apertures in the tube opening through the lower end, wherein the extension tubes and upper ends of the legs are secured together by the U-shaped security pins.

13. The support structure of claim 12, wherein one arm of the U-shaped security pin is longer than the other arm.

14. The support structure of claim 8, 12 or 13, wherein the U-shaped security pin is bent in the direction of the arms intermediate the arms.

15. The support structure of claim 12 wherein the lower ends of the legs of the lowermost section are extendible.

16. The support structure of claim 15 wherein the lower ends of the legs are extendible by extension tubes telescopically extending from the lower ends of the legs, the extension tubes and the lower ends of the legs, having equally spaced aligned holes therethrough with the upper end of each extension tube comprising diametrically opposed semi-circular apertures in the tube opening through the upper end and wherein the extension tubes and lower end of the legs are secured together by U-shaped security pins comprising two arms for removably securing the extension tubes to the legs.

17. The support structure of claim 16 wherein one arm of each U-shaped security pin is longer than the other arm.

18. A support structure for supporting concrete building forms, the support structure formed in one or more sections and having vertically extending legs which are extensible at at least one end thereof by extension tubes extending vertically from the legs, the extension tubes and portion of the legs from which the extension tubes extend having equally spaced aligned holes therethrough with the end of each extension tube proximate the leg portion having the apertures therethrough, having diametrically opposed semi-circular apertures in the extension tubes opening through the end of the extension tube and wherein the extension tubes and legs are secured together by U-shaped security pins comprising two arms for removably securing the extension tubes to the legs.

19. The support structure of claim 18, wherein one arm of each U-shaped security pin is longer than the other.

20. The support structure of claim 18 or 19, wherein the U-shaped security pin is bent in the direction of the arms intermediate the arms.

21. The support structure of claim 18 or 19, wherein the legs are extensible in a direction above the support structure, and the lower end of the extension legs comprises the semi-circular apertures which open through the lower end of the extension legs.

22. The support structure of claim 18 or 19, wherein the legs are extensible in a direction below the support structure and the upper end of the extension legs comprises the semi-circular apertures which open through the upper end of the extension legs.

* * * * *